United States Patent [19]
Østergaard

[11] Patent Number: 6,068,427
[45] Date of Patent: May 30, 2000

[54] SYSTEM AND METHOD FOR REPLACEMENT OF COMPONENTS ON SEA BOTTOM-BASED INSTALLATIONS

[75] Inventor: Inge Østergaard, Heggedal, Norway

[73] Assignee: ABB Offshore Technology AS, Billingstad, Norway

[21] Appl. No.: 09/091,215
[22] PCT Filed: Dec. 20, 1996
[86] PCT No.: PCT/NO96/00298
§ 371 Date: Nov. 4, 1998
§ 102(e) Date: Nov. 4, 1998
[87] PCT Pub. No.: WO97/23709
PCT Pub. Date: Jul. 3, 1997

[30] Foreign Application Priority Data

Dec. 22, 1995 [NO] Norway .................................. 955289

[51] Int. Cl.[7] .............................. B63C 11/10; E21B 7/12
[52] U.S. Cl. ..................... 405/191; 405/188; 405/190; 166/345; 166/351; 166/365
[58] Field of Search .................... 405/188, 190, 405/191; 166/338, 339, 340, 344, 345, 365

[56] References Cited

U.S. PATENT DOCUMENTS

| | | | |
|---|---|---|---|
| 3,369,368 | 2/1968 | Wilson | 405/192 |
| 3,795,114 | 3/1974 | De Cremiers et al. | 405/191 |
| 4,386,659 | 6/1983 | Shotbolt | 166/344 X |
| 4,443,129 | 4/1984 | De Silvry et al. | 405/170 |
| 4,460,295 | 7/1984 | Migliarese-Caputi et al. | 405/303 |
| 4,490,073 | 12/1984 | Lawson | 166/344 X |
| 4,601,610 | 7/1986 | Campbell . | |
| 4,618,285 | 10/1986 | Ahlstone . | |
| 4,682,913 | 7/1987 | Shatto et al. | 166/344 X |
| 4,721,055 | 1/1988 | Pado . | |
| 4,730,677 | 3/1988 | Perace et al. | 166/345 |
| 4,753,552 | 6/1988 | Karal et al. | 405/188 X |
| 4,943,187 | 7/1990 | Hopper . | |
| 5,046,895 | 9/1991 | Baugh . | |
| 5,069,580 | 12/1991 | Herwig et al. . | |
| 5,320,175 | 6/1994 | Ritter et al. | 166/339 |
| 5,593,249 | 1/1997 | Cox et al. | 405/191 |

FOREIGN PATENT DOCUMENTS

160190  12/1988  Norway .

*Primary Examiner*—David Bagnell
*Assistant Examiner*—Jong-Suk Lee
*Attorney, Agent, or Firm*—Nixon & Vanderhye

[57] ABSTRACT

A system and methods for diverless replacement of a functional component installed on a service unit on a sea bottom-based installation is provided. The component is fitted releasably into the service unit as an insert with an externally extending maneuverable part. The replacement is carried out by a tool mounted on a remotely operated vehicle (ROV). The invention utilizes ROV supported weight compensation means for compensating the weight of the component in order to maintain the ROV in a substantially neutral buoyancy state during operations. The weight compensating means comprises a separate adapter element having the same weight as the component to be replaced. The adapter element or adapter are equipped to be releasably supported by the ROV tool. The adapter has an upper end and a lower end and a central axis extending therethrough, and a centrally extending throughgoing opening having transverse dimensions larger than the largest transverse dimension of the component. The upper end of the adapter is arranged to be releasably connected to the manipulating tool and the lower end of the adapter is fitted for positioning on the service unit circumscribing the externally extending part of the component.

9 Claims, 5 Drawing Sheets

SYSTEM AND METHOD FOR REPLACEMENT OF COMPONENTS ON SEA BOTTOM-BASED INSTALLATIONS

The present invention relates generally to systems and methods for remotely controlled handling, manipulating and replacement of components on sea bottom based installations. Such equipment is usually mounted on a so-called template or bottom frame installed on the sea bottom, and comprises equipment such as valves, couplings, controls, piping, instrumentation etc.

Bottom based installations of this kind is in increasing degree designed such that service components can be operated and replaced preferably by means of tools mounted on a so-called ROV, i.e. remotely controlled movable underwater vessels, equipped with tooling in order to carry out the necessary work.

A problem in connection with the use of remotely controlled sub-sea vessels, hereinafter called ROV, is that the weight or buoyancy of the ROV with everything attached thereto, usually will vary during the work in connection with the replacement, because, when a component for instance is released from the installation and is supported by the tool on the ROV, the weight of the ROV will increase equal to the component weight. And on the contrary, when the ROV is submerged down from the sea surface with a component to be mounted on the installation, the weight of the ROV will be reduced accordingly. Such weight variations create problems, and in order to manoeuvre the ROV under full steering control, the ROV must usually be provided with adjustable buoyancy or be cable suspended during submersion with supported equipment, so that the ROV subsequent to release of the equipment is attaining neutral buoyancy. A usual way to solve these problems is to utilise larger and more costly ROVs, which however is followed by increased costs. Replacement of equipment and the like will still be rather time consuming due to the need for buoyancy variations, and which again leads to expensive operations.

A main object for the present invention is to arrive at a new solution of this problem, such that the ROV can preserve substantially neutral buoyancy during replacement operations. Thereby, one can utilise a smaller and less expensive ROV, at the same time as the necessary operations can be carried out in less time.

SUMMARY OF THE INVENTION

The present invention is based on the known principle of utilising various kinds of counterweights in order to compensate varying loads on the ROV in order to obtain an approximate neutral equilibrium buoyant state in the ROV, including equipment attached thereto during the operations. Known systems are, however, hampered with complexity, require use of complicated handling equipment and some also require the use of cables leading to the sea bottom for buoyancy adjustment and/or cable up to a surface vessel.

As illustrative for the known art, one can refer to Norwegian patent 165487 and U.S. Pat. Nos. 4,721,055 and 5,046,895.

The system in accordance with the invention for diverless replacement of a functional component installed on a service unit on a bottom based installation, concerns primarily components which may be fitted releasably into said service unit as inserts, and having an externally extending manoeuverable part, and where said replacement is carried out by a manipulating tool mounted on a remotely operated vehicle (ROV), and where ROV supported weight compensation means are used for compensating the weight of the component in order to maintain the ROV in substantially neutral buoyancy state during the operations, and the system is based on a weight compensation means comprising a separate adapter element having the same weight as the component to be replaced, said adapter element or adapter equipped to be releasably supported by the manipulating tool, said adapter having an upper end and a lower end and a central axis extending therethrough, and a centrally extending throughgoing opening having transverse dimensions larger than the largest transverse dimension of the component, the upper end of said adapter arranged to be releasably connected to said manipulating tool and said lower end of said adapter fitted to be positioned on the service unit circumscribing the externally extending part of said component, resulting in that the adapter and the component, respectively, can be exchanged in position on the service unit.

The system in accordance with the invention is primarily intended to be used in connection with vertically mounted equipment, i.e. equipment which can be mounted and released in vertical direction, such that the adapter during the replacement operations is lowered vertically down on to a seating on the service unit in question, and where the component likewise is mounted and released vertically. During the replacement operation, the adapter is circumscribing the upper, external part of the component, which thus can be moved up and down inside the adapter. During these operations, the ROV will normally carry either the adapter or the component, thereby maintaining the ROV in substantially neutral buoyancy state. The adapter is preferably realised as a substantially tube-shaped body, open at both ends.

The invention relates further to special methods or procedures for carrying out replacement of a component installed on a service unit on a bottom based installation in order to install a similar new component, which method includes use of manipulator tooling or the like mounted on an available ROV, and utilising an adapter element as described with the aim to maintain the ROV with equipment in a substantially neutral buoyancy state.

The ROV tool is preferably fitted with two coaxial sets of tools, namely one set for carrying and installing the component, and another set for engaging and supporting the adapter, and further a manipulating tool for releasing and coupling the component to the service unit.

A released, used component can be transported by the ROV up to a surface vessel and substituted with a new replacement component etc. Alternatively, one can in connection with the replacement procedure initially lower down from a surface vessel a basket or pallet carrying one or more replacement components and at least one extra adapter element. Thereafter, one can carry out one or more replacements of components by swimming the ROV back and forth from the bottom based pallet with extra units and the various component positions on the bottom based frame.

The service unit is preferably provided with special seating implements, matching a complementary footing at the bottom part of the adapter, whereby the adapter can be guided and firmly kept in position on the service unit during the replacement operation.

The component is preferably equipped with special coupling means, which can be serviced by means of rotary tooling on the manipulator tool.

The tool mounted or suspended on the ROV for carrying out the replacement procedures comprises, as mentioned, three units, namely one first unit effecting gripping and supporting of the adapter, a second centrally located unit providing releasable support for the component, the third unit comprising a manipulating tool to accomplish the coupling of the component to the service unit.

The adapter element may be given different configurations and dimensions in order to suitably match the component which shall be replaced. A preferred embodiment of the adapter is however given the shape of a pipe section or funnel, open in both ends, which is dimensioned to subscribe the component dimensionally and having an upper end fitted for engagement with the ROV suspended tool, and a lower end with transverse supporting face fitted for engagement with matching seating means on the service unit, providing stable support for the adapter.

The various kinds of components which are replaceable in conjunction with the invention, must be especially designed and constructed such that the component can be positioned, securely coupled and furthermore be releasable by means of the tools mounted on the ROV.

In the following description, with reference to the accompanying drawings, the invention shall be illustrated in connection with a component in the shape of a replaceable valve insert comprising a lower part constituting the valve stem, and an upper part including valve control means and special coupling means which can be actuated by means of the manipulating tool on the ROV. The adapter is realised as a pipe- or funnel shaped member configurated and dimensioned to match the valve insert.

BRIEF DESCRIPTION OF THE DRAWING FIGURES

Reference is made to the accompanying drawings, wherein:

FIGS. 2a and 2b show, respectively, two embodiments of a ROV equipped with a ROV tool in accordance with the invention, and wherein FIG. 2a shows an embodiment for vertical suspension of a ROV tool, while FIG. 2b shows an embodiment for lateral suspension or mounting of the ROV tool.

DESCRIPTION OF A PREFERRED EMBODIMENT

In all Figures, the same reference numbers are used on the same parts.

Figure 1:
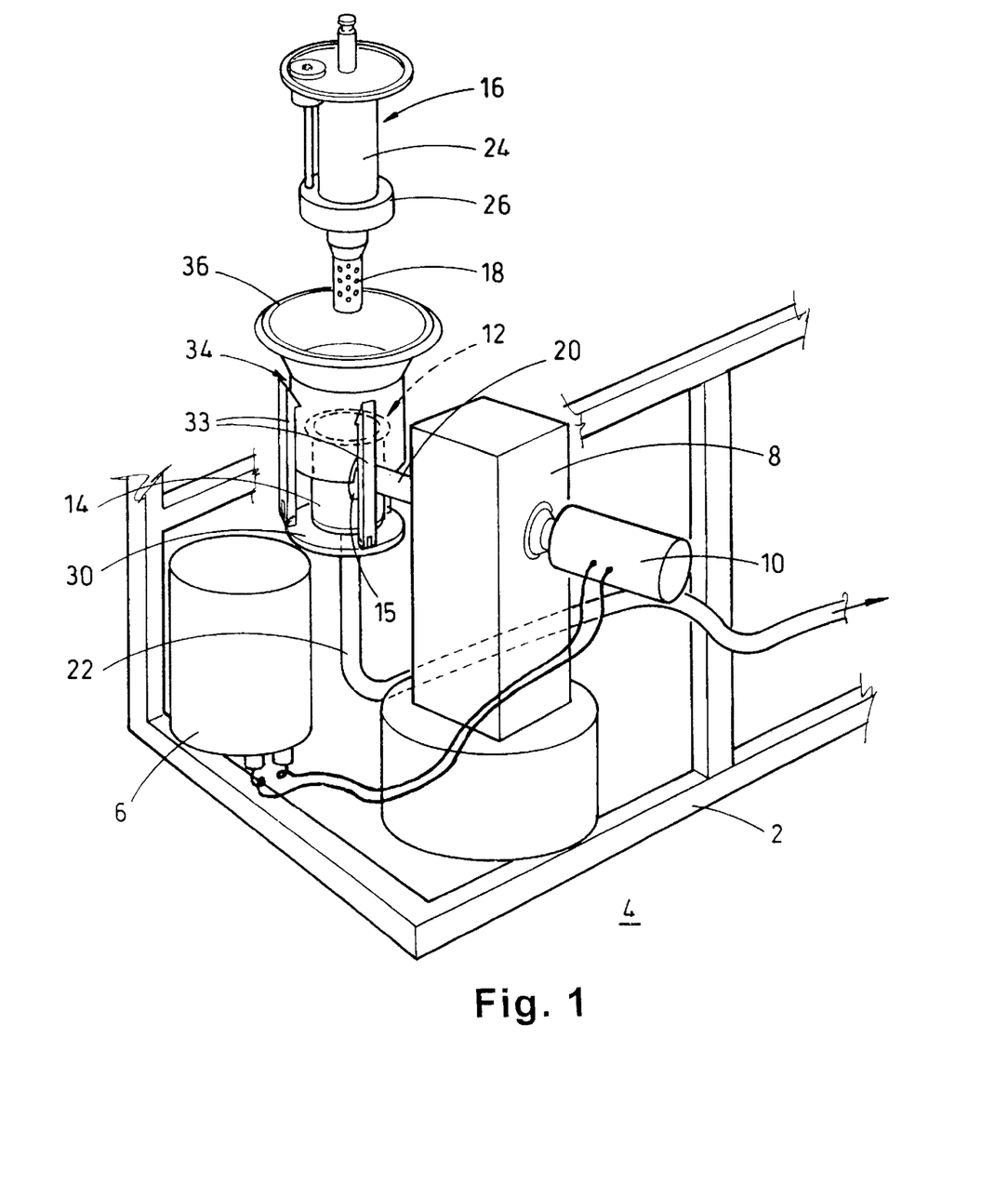
FIG. 1 is a schematic perspective view of a section of a bottom based template with a service installation, including a choke valve with a replaceable valve insert.

FIG. 1 shows a perspective view of a part of a bottom template or frame 2 anchored to a sea bottom 4, and equipped with conventional service and process equipment for oil/gas production, as shown including a control unit 6, a valve/monitoring aggregate (valve three) 8 including a horizontally mounted actuator 10 for monitoring a choke valve generally designated with the number 12 of in per se known design, including a permanently mounted valve housing 14. The choke valve insert is generally given the reference number 16, and is for the sake of clarity shown in dismounted, elevated position. A choke valve of this type comprises a cylinder- or sleeve-shaped perforated valve element 18, the outer diameter of which is somewhat smaller than the inside diameter of the valve housing 14, so that an intermittent, ring-shaped space exists for passing the transport medium, such as oil or gas. The valve housing 14 has a radial inlet 15 leading out to a is closing valve (not shown), which is controlled by the actuator 10, and a vertically directed axial outlet 22. The choke valve is adjusted by rotating the valve element 18 (see FIG. 5). A driving motor is positioned in a housing 24, mounted on a coupling/support flange 26 on the valve housing, which on mounting is fixed to the top of the valve housing 14. All parts hitherto described belong to the known technique.

At the lower part of the valve housing 14 is mounted a radially extending support flange 30, on which is mounted three upwardly directed, circumferentially spaced gripping arms 33,33,33 designed to grasp around and keep firmly the pipe-shaped adapter 34. The gripping arms 33 have on the inside suitable knobs or grooves which can co-operate with complementary grooves or knobs on the inside of the adapter 34, and thereby ensure correct angular position of the adapter during the seating of the same, for instance in order to secure that the cut-out 35 (see FIG. 4c) at the lower end of the adapter straddles the valve inlet 15.

Figures 2A, 2B:
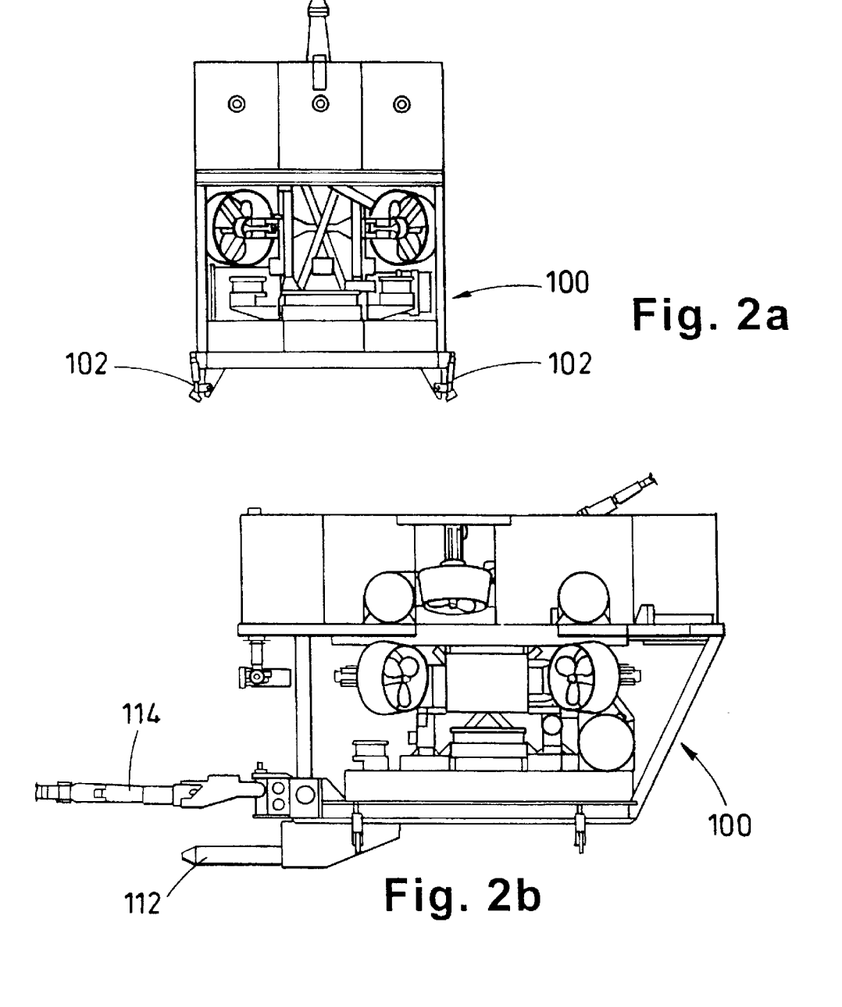
Figure 2C:
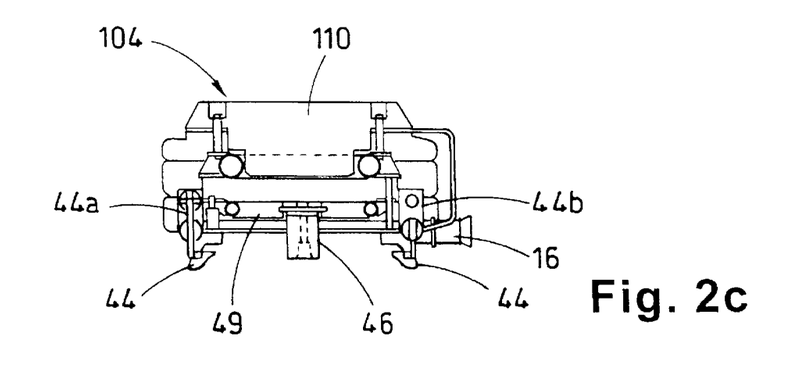
FIG. 2c shows a ROV tool in accordance with the invention, which can be connected to the ROV, either in vertical suspended or lateral suspended position on the ROV.

FIGS. 2a and 2b show lateral views of a ROV of in per se standard design. The ROV 100 shown in FIG. 2a is at the bottom provided with pivotable brackets 102,102 to support a ROV tool 104 (shown in lowered, released position in FIG. 2c) in accordance with the invention, which is equipped with two sets of grippers or tools, namely firstly a set circumferentially arranged grippers 44, designed to grasp around a flange 21 on the adapter 34, and one second centrally mounted tool or gripping means in the shape of a rotatable chuck 46, mounted on a superimposed transverse carriage 49 which is suspended in hydraulic cylinders or the like, so that the carriage 49 with the chuck 46 may be hoisted up and down. The ROV tool 104 is further provided with adjustable buoyancy means 110 so that the weight of the ROV, including the tool and the adapter or the component, respectively, can be given substantially neutral buoyancy.

FIG. 2b shows a different embodiment for the ROV. The ROV is here provided with laterally directed suspension means 112,114, whereof the means 112 is configured as a spear which can be passed into a complementary supporting funnel on the ROV tool 104. By means of the suspension means 114, the ROV tool 104 can be manoeuvered in the horizontal plane.

Figure 3A:
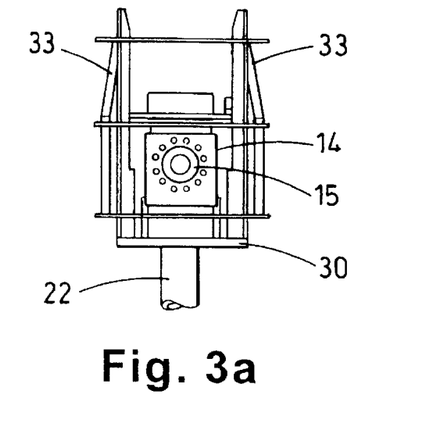
FIG. 3a is a fragmentary view, illustrating a sea bottom installation with a choke valve provided with positioning means for the adapter.
Figure 3B:
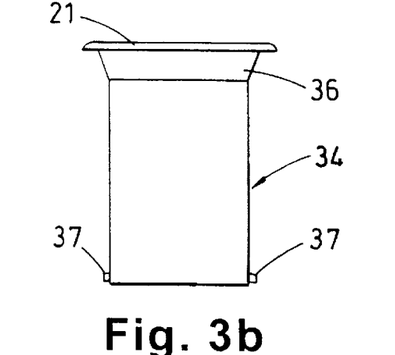
FIG. 3b is a lateral view of one embodiment for the adapter.
Figure 3C:
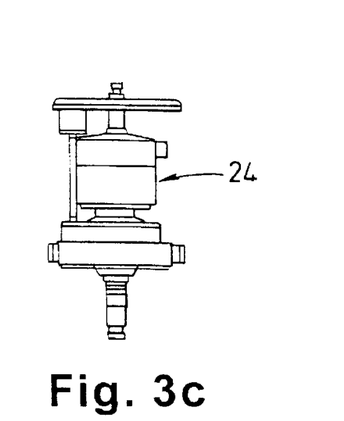
FIG. 3c is a lateral view of the choke valve insert, fitting the choke valve shown in FIG. 3a, FIGS. 4a, 4b and 4c show, respectively, a ROV with ROV tool in operation during three selected steps during the operations in connection with replacement of the valve insert as shown in FIG. 3c.

FIG. 3a is a detail cut-out view which shows the valve housing 14 (the insert is removed) with the inlet 15 for a pipeline 20 (see FIG. 1). The valve housing is at the lower end provided with a support flange 30, on which is mounted two or more upwardly is directed gripping arms 33,33, designed to grasp around the adapter 34 when positioning same on the valve housing. The valve housing is mounted on top of the vertical outlet pipe 22. FIG. 3b is a lateral view of an embodiment of the adapter 34, which in the shown embodiment is realised as a pipe-shaped member, the upper part of which is shaped as a funnel 36 ending at the top in a circumferential flange 21, serving as gripper means for the grippers 44 in the ROV tool (see FIG. 2c). At the bottom of the adapter are positioned knobs or the like 37 fitting into complementary locking means inside the gripping arms 33,33 (not shown). FIG. 3c is a lateral view of a choke valve insert fitting into the valve housing 14. The valve insert is shown in a larger scale in FIG. 5, and shall be further described later.

Figure 4A:
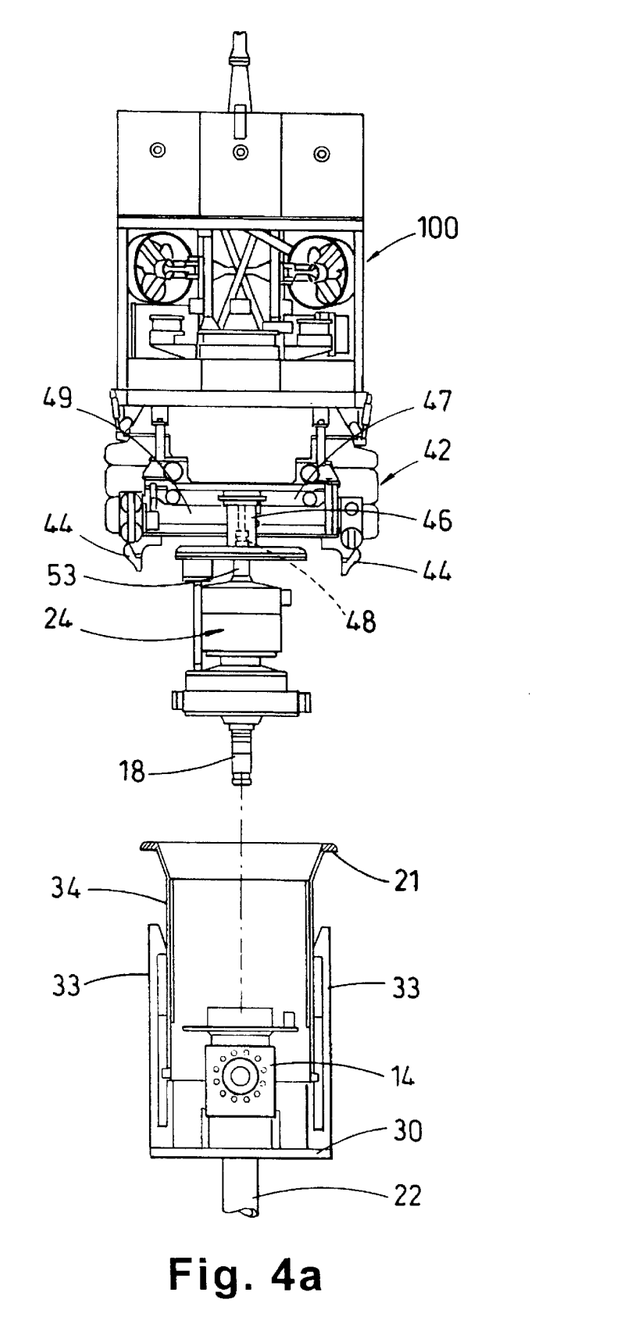

FIGS. 4a, b and c illustrate three arbitrarily selected phases during the procedure for replacement of the shown valve insert, utilising the principles of the invention. The ROV tool is as already described provided with a first set of tools in the shape of circumferentially spaced, pivotable, remotely operated retaining grippers 44, designed to grasp around the top flange or edge 21 on the adapter 34, best shown in FIG. 3b. The ROV tool is further provided with the second centrally positioned chuck mounted on the transverse hoistable carriage 49 in order to handle the component which shall be replaced.

FIG. 4a comprises two separated parts, namely an upper part in which a valve insert 24 is suspended and carried by the chuck 46 on the ROV tool, and a lower part showing the adapter 34 in position inside the gripping arm 33, mounted on the flange 30 on the valve housing 14. FIG. 4a illustrates the replacement situation where the adapter (in a preceding step) has been lowered down and positioned on the service unit, and the valve insert to be replaced has been released from the valve housing 14 and elevated up through the adapter to the shown position.

An important detail in this connection is that the hoisting mechanism for the chuck in the ROV tool can be used for forcible release of the valve housing up from position in the valve house, if necessary, when the ROV tool is still biased against the adapter positioned on the valve housing.

Figure 4B:
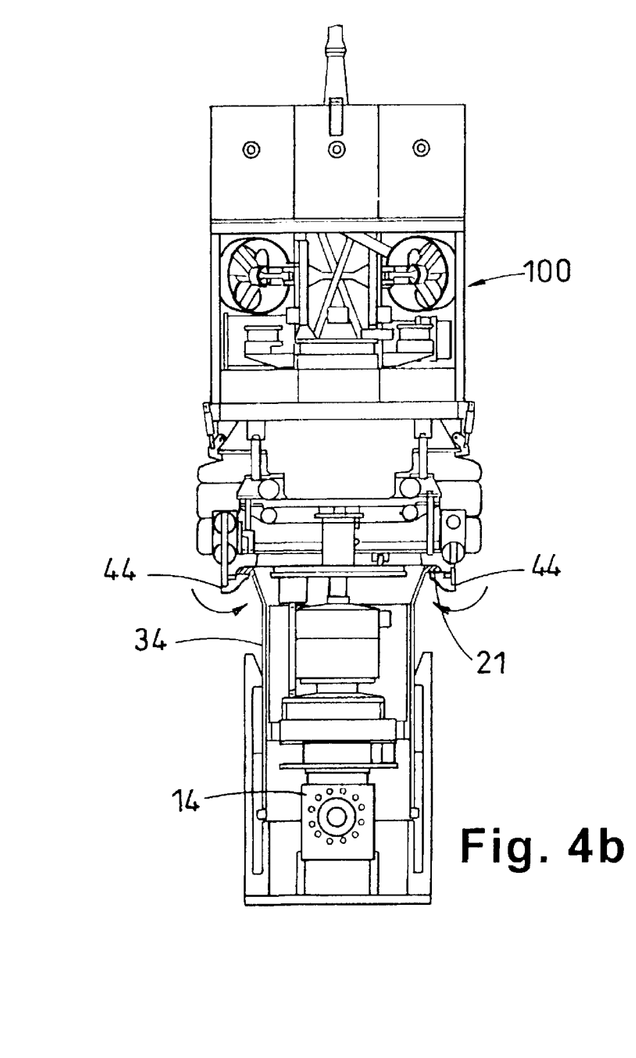
Figure 4C:
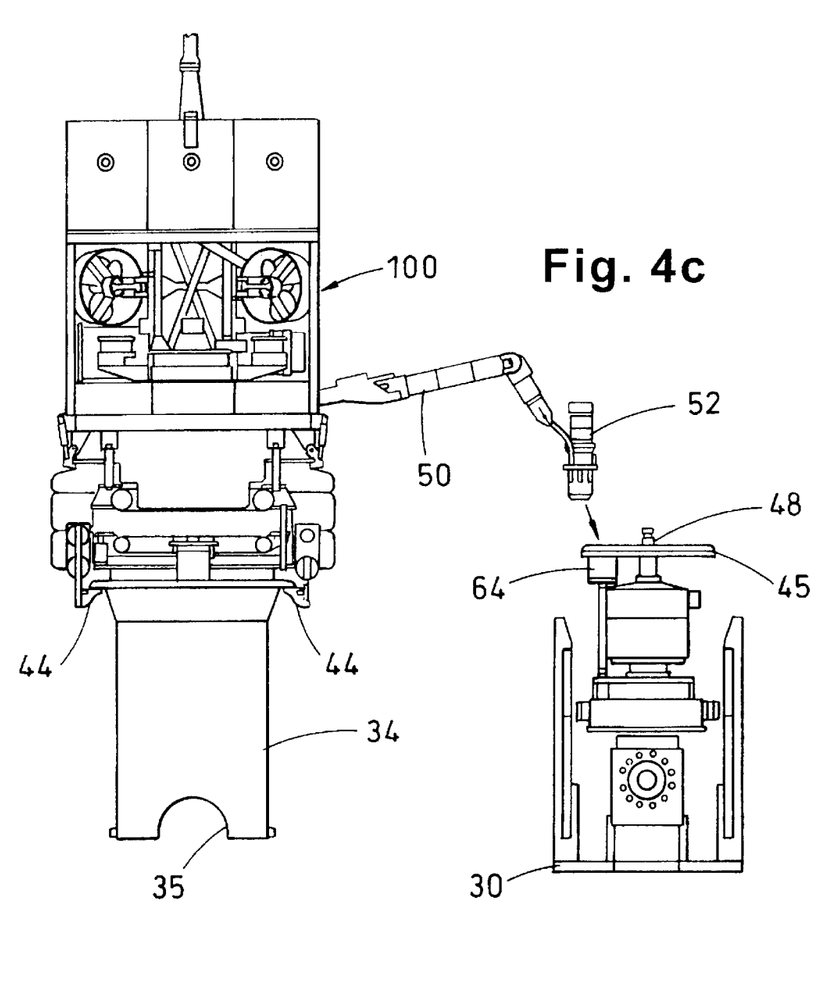

FIG. 4b is showing the situation wherein the replacement valve insert has been lowered down through the adapter and into the valve housing. It should be noted that under these operations, the adapter 34, which is firmly held by the circumscribing gripping arms 33, serves as a positioning guide for the ROV with the valve insert during the lowering and placement of the same. When the valve insert has been placed in the valve housing as shown in FIG. 4b, the grippers 44 grab below the flange 21 on the adapter 34. In this position, the grippers 44 are pivoted inwards below the flange 21 in the funnel 34 as shown in FIG. 4b, whereafter the grippers 44 are moved upwards, having into effect that the valve insert is pressed down into the valve housing with a force equivalent to at least the weight of the adapter, since the ROV may in this situation supports both the valve insert and the funnel. In order to obtain a further downward force to press the valve insert further down into the valve seat, if necessary the carriage 49 for the chuck can be moved quickly downwards. Thereafter, the valve insert 24 is released from the tool by releasing the chuck 46 from the valve shaft extension 47. Thereafter the ROV together with the adapter 34 is moving or swinging upwards, then laterally, to a position as shown in FIG. 4c. It will be understood that the total weight of the ROV including the tool has under the before-mentioned procedures remained unchanged, since either the ROV has carried the valve insert or the adapter.

FIG. 4c illustrates the situation where the replacement insert has been lowered down into the valve housing, and the ROV has been removed from the valve housing together with the suspended adapter 34. The final coupling and sealing of the insert in the valve is now carried out by the shown manipulating tool 50 with a power driven chuck 52. The operation shall be described in detail in conjunction with FIG. 6.

Figure 5:
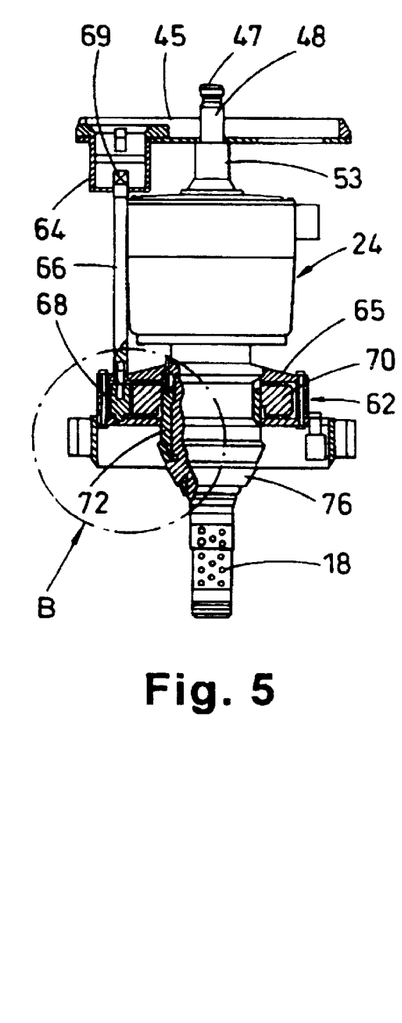
FIG. 5 shows a choke valve insert provided with special attachments to be used in connection with the invention.

FIG. 5 is a lateral view, partly in section, illustrating a valve insert supplied with special structural implements in order to adapt the insert to be used in conjunction with the system in accordance with the invention, including the adapter concept and the method for carrying out the replacement operation.

Figure 6:
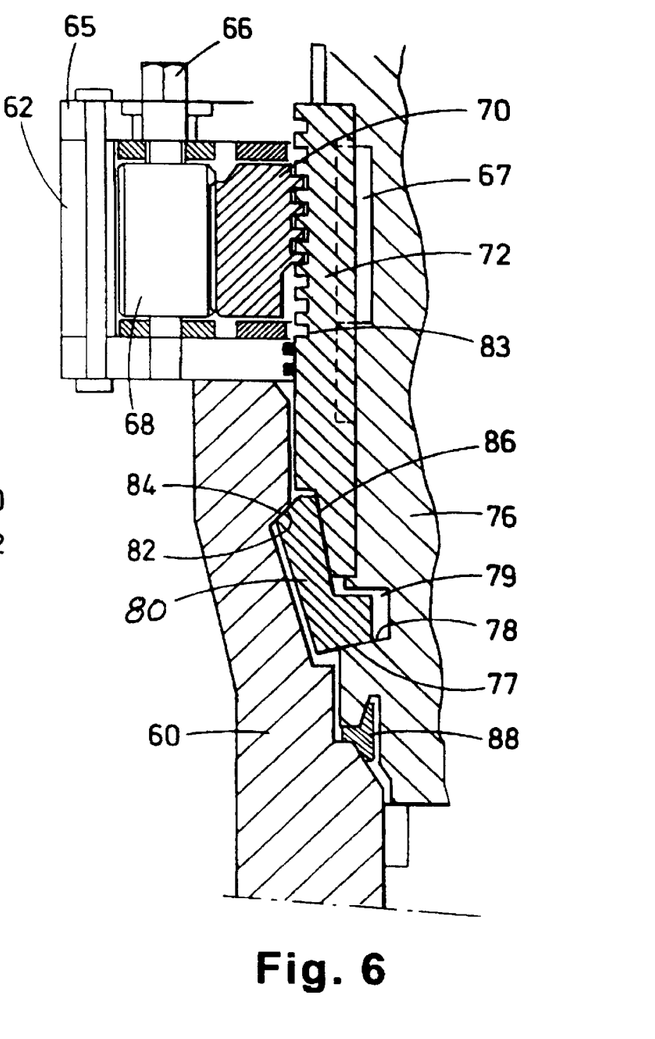
FIG. 6 shows an enlarged section of a mechanism for coupling and sealing of the valve insert on the valve housing.

FIG. 6 is a detail view showing in an enlarged scale the part of the valve unit appearing inside the circle marked "B" in FIG. 5.

On top of the valve insert 24 is, as shown in FIG. 5, provided a lateral stay 45 mounted on a support sleeve 53 on a drive shaft extension 48. On the stay 45 is mounted a drive box 64 for a drive rod 66, provided on top with a gripper head 69 for the chuck 52. The drive rod 66 extends down to the gear box 62 mounted on a support flange 65 for the valve insert. As best shown in FIG. 6, the drive rod 66 is at the bottom connected to a pinion wheel 68 in engagement with a planet or sun gear wheel 70, which encircles the valve stem 76 and which on the inside is provided with teething in engagement with complementary teething on a sleeve 72, which is axially displaceable but not rotatably positioned on the valve stem 76 by means of the splint key arrangement 67, as shown in FIG. 6.

As best shown in FIG. 6, in the valve seat a number of circumferentially spaced latch elements or dogs 80 are arranged, which at the top are outwardly bevelled providing a wedge face 82 adapted to be biased against a complementary wedge surface 84 in the valve seat 60. The lower part or bottom surface 77 of the dogs 80 are biased against a radially extending matching surface 78, provided in a cutout 79 on the valve stem 76. The dogs are provided with transverse openings, not shown, through which are positioned a circumferentially running spring cord, biasing the dogs against the outside adjacent surface 86 of the sleeve 72.

The coupling- and sealing means shall be described in detail in connection with the operation of the mechanism.

In FIG. 6, the valve insert is shown in coupled and sealed position. In this position, the sleeve 72 has by means of the gear mechanism been moved downwards to the shown bottom position, whereby the dogs 80 have been pressed outwards in wedging contact between the inside face of the dogs and the adjacent tapering outside surface 86 on the sleeve. The matching wedge surfaces 82,84 on the dog and the adjacent wedged surface on the stem provide a downward pressing of the valve stem 76 via the wedged radial surfaces 77,78, resulting in that a double wedged steel seal ring 88 is pressed against the adjacent wedged surfaces in the valve stem and the valve housing, respectively. It is appreciated that this construction results in that simultaneously as the dogs through a wedge effect are pressed against the valve housing, the steel seal 88 is tensioned.

When the valve insert 24 is installed and sealed in the valve housing 14 as shown in FIG. 4b, the mechanism has provided a pressure resistant, locked mounting and sealing of the valve stem to the valve seat via the steel seal 88. The ROV together with the adapter can now swim to the sea surface, or another replacement operation.

When the valve insert 24 shall be removed and replaced, the operation is reversed. Firstly, the insert must be released from the valve seat by means of the manipulating tool 50, as illustrated in FIG. 4c. Upon rotation of the pinion 68 in releasing direction, the sleeve 72 will be forced upwards along the valve stem 76. Thereby, the lower part of the sleeve 72 will then come into position, almost above the dogs 80, but will stop against the complementary bevelled surfaces 84. The sleeve 72 will be prevented from further upward movement effected by a radially extending collar face 83 hitting the underside of the gear 70. During this movement, the dogs will by means of spring elements, not shown, be pressed radially inwards, having into effect that the outer extremity of the dogs will come clear of the adjacent upper inside face of the valve housing 60. The entire valve insert as shown in FIG. 5 can now be hoisted up and removed from the valve housing 60.

Above is described one complete structural embodiment to practise the invention. It will of course be understood that the invention is not limited to a choke valve insert as shown, and is by no means limited to the shown mounting and coupling solution, since the invention can be realised with other types of coupling mechanisms. It is, however, preferred that installation and removal of the component in question can be carried out by means of tools mounted on a ROV. Furthermore, it will be understood that the adapter element can be given different configurations and the size and dimensional relationship must be conformed to the type of component which shall be replaced. It is, however, essential that the adapter can be positioned on the service unit including the component to be replaced, so that the ROV including the ROV tool can preserve its neutral buoyancy state during the replacement work. A special advantage of the adapter solution in accordance with the invention, is that the adapter further to the neutral buoyancy aspect can serve as a positioning and support element during the replacement operation.

One mode or method to practice the invention includes the following general steps:

providing a weight element in the shape of a separate adapter having an upper end and a lower end and a throughgoing centrally extending opening, which adapter has the same weight as the component, the throughgoing opening through the adapter being larger than the largest transverse dimension of the component, which adapter is dimensioned and fitted to be positioned on the service unit in circumscribing position relative to the component, suspending the adapter in the manipulating tool at sea surface level, transporting or swimming the adapter down from the sea surface or a storage place on the sea bottom to the service unit, positioning the adapter on the service unit in circumscribing position relative to the component, providing a stabilised position of the adapter on the service unit while being supported by the manipulating tool, releasing the component from the service unit by means of the manipulating tool operative to suspending the component in the manipulating tool, releasing the adapter from the manipulating tool, transporting (swimming) the component from the service unit to a storage position, for instance at the sea surface or alternatively to a storage place on the sea bottom, while leaving the adapter on the service unit, thereby maintaining the ROV in substantially neutral buoyancy state, replacing the used component on the storage place with a new, similar component, swimming the new component from the storage place to the service unit, placing the component on the service unit while utilising the adapter positioned on the same as supporting guide for the ROV with the manipulating tool and suspended new component, final positioning and installation of the new component in the service unit utilising the manipulating tool, connecting the manipulating tool to the adapter before or after releasing the component from the manipulating tool, whereafter the ROV with the adapter is operative to swim away from the service unit, whereby is accomplished that the entire component replacement has been effected with maintenance of the total weight of the ROV in substantially neutral buoyancy state.

The method can be practised with minor modifications in regard to some of the steps. As mentioned before, it may for instance be an advantage to utilise the weight of the adapter to provide complete insertion of the component into the service unit, an operation which may require extra power. This can be provided by engaging the manipulating tool with the adapter which simultaneously supporting the component positioned in the service unit, and thereafter carry out a slight elevation of the adapter, whereby the weight of same will facilitate insertion of the component down into the service unit.

The invention is described in connection with replacement of one single component, installed on a bottom based service unit. The invention can, however, be utilised when the replacement operation concerns replacement of several component having the same weight. The adapter is in such an operation moved from component to component, while the ROV brings and installs one component after the other. It is not necessary for the ROV to operate between the sea surface and the bottom based installation. In an alternative procedure, a basket or pallet furnished with two or more components and a spare adapter can be submerged down from a surface vessel and positioned on or beside the bottom based frame. Thereafter, the ROV can move or swim between the installation and the pallet, and carry out the desired replacements with preservation of the neutral buoyancy principle during the replacement work.

The invention is most easily adaptable in connection with vertically mounted installations, so that the centre of gravity in the various units can be located along a vertical central axis. However, the invention can also be realised in connection with for instance tilted or lateral installations.

What is claimed is:

1. A system for diverless replacement of a functional component installed on a service unit on a sea bottom-based installation, said component being releasably fitted into said service unit as an insert with an externally extending maneuverable part, said replacement being carried out by a manipulating tool mounted on a remotely operated vehicle (ROV), said ROV supporting a weight compensation means, said system utilizing the ROV-supported weight compensation means for compensating for the weight of the component in order to maintain the ROV in a substantially neutral buoyancy state during said replacement, said weight compensation means comprising a separate adapter having the same weight as the component to be replaced, said adapter being equipped to be releasably supported by said manipulating tool, said adapter having an upper end, a lower end, a central axis extending therethrough and a centrally extending throughgoing opening having transverse dimensions larger than the largest transverse dimension of the component, the upper end of said adapter being arranged for releasable connection to said manipulating tool and said lower end of said adapter fitted for positioning on the service unit circumscribing the externally extending part of said component.

2. The system in accordance with claim 1 including a valve unit having seating and engagement means for receiving and holding said adapter in an axially and laterally stable manner.

3. The system in accordance with claim 2 wherein said adapter has a substantially tube-shaped body open at both ends.

4. The system in accordance with claim 1 wherein said adapter on the service unit serves as a guide and support for said ROV during said replacement.

5. The system in accordance with claim 1 wherein said service unit comprises a vertically mounted valve unit including a valve housing, said component comprising a vertically extending valve insert having a valve stem normally mounted inside the valve housing, said externally extending part including a valve stem extension, said insert further comprising maneuvering means utilized for installation of said valve insert.

6. The system in accordance with claim 5 wherein said tool comprises first and second sets of tools for supporting and maneuvering said adapter, and for supporting and installing said valve insert, respectively.

7. The system in accordance with claim 6 wherein said first and second set of tools comprise respective gripper means hoistably and lowerably mounted on said tool.

8. A method for replacing a used component installed on a service unit on a sea bottom-based installation and installing a new component in its place using a manipulating tool mounted on an ROV having weight compensation means for compensating for the weight of the component to maintain the ROV in a substantially neutral buoyancy state during replacing, said method comprising the following steps:

providing an adapter having an upper end, a lower end and a throughgoing centrally extending opening, said adapter weighing substantially the same as the used component, the throughgoing opening through the adapter being larger than the largest transverse dimension of the used component, said adapter being dimensioned for positioning on the service unit in circumscribing position relative to the used component;

suspending the adapter in the manipulating tool at sea surface level;

transporting the adapter from the sea surface level or a storage place on the sea bottom to the service unit;

positioning the adapter on the service unit in circumscribing position relative to the used component;

stabilizing the adapter on the service unit while the adapter is supported by the manipulating tool;

releasing the used component from the service unit by means of the manipulating tool and suspending the component in the manipulating tool;

releasing the adapter from the manipulating tool;

transporting the used component from the service unit to a storage position at the sea surface or to the storage place on the sea bottom, while leaving the adapter on the service unit, thereby maintaining the ROV in the substantially neutral buoyancy state;

releasing the used component from the manipulating tool and connecting the new component to the manipulating tool;

transporting the new component to the service unit;

placing the new component on the service unit while using the adapter positioned thereon as a supporting guide for the manipulating tool;

releasing the new component from the manipulating tool;

connecting the manipulating tool with the adapter before or after release thereof from the new component; and moving the ROV with the suspended adapter away from the service unit whereby the used component has been replaced by the new component while maintaining the weight of the ROV in said substantially neutral buoyancy state.

9. The method in accordance with claim 8 including using the weight of the adapter to positively press the new component onto the service unit with the adapter resting on the service unit and connected to the manipulating tool whereby the ROV supports both the adapter and the new component.

* * * * *